(12) United States Patent
Luo et al.

(10) Patent No.: US 12,499,603 B2
(45) Date of Patent: Dec. 16, 2025

(54) THREE-DIMENSIONAL IMAGING METHOD, APPARATUS, AND DEVICE, AND STORAGE MEDIUM

(71) Applicant: ZTE CORPORATION, Shenzhen (CN)

(72) Inventors: Yibao Luo, Shenzhen (CN); Jingbo Wei, Shenzhen (CN); Rong Jia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 216 days.

(21) Appl. No.: 18/549,731

(22) PCT Filed: Mar. 9, 2022

(86) PCT No.: PCT/CN2022/079988
§ 371 (c)(1),
(2) Date: Sep. 8, 2023

(87) PCT Pub. No.: WO2022/227875
PCT Pub. Date: Nov. 3, 2022

(65) Prior Publication Data
US 2024/0153193 A1    May 9, 2024

(30) Foreign Application Priority Data

Apr. 29, 2021    (CN) .......................... 202110474587.X

(51) Int. Cl.
*G06T 15/00*    (2011.01)
*G06T 9/00*    (2006.01)

(52) U.S. Cl.
CPC ................ *G06T 15/00* (2013.01); *G06T 9/00* (2013.01)

(58) Field of Classification Search
CPC ........... G06T 7/521; G06T 2207/10028; G06T 2207/30208; G06T 7/80; G06T 15/00;
(Continued)

(56) References Cited

U.S. PATENT DOCUMENTS 10,902,623 B1    1/2021    Li et al.
2002/0164066 A1*    11/2002    Matsumoto ............. G06T 17/10
382/154
(Continued)

FOREIGN PATENT DOCUMENTS

CN    103221975 A    7/2013
CN    107358645 A    11/2017
(Continued)

OTHER PUBLICATIONS

European Patent Office. Extended European Search Report for EP Application No. 22794354.5, mailed Oct. 24, 2024, pp. 1-7.
International Searching Authority. International Search Report and Written Opinion for PCT Application No. PCT/CN2022/079988 and English translation, mailed May 12, 2022, pp. 1-10.

*Primary Examiner* — Hau H Nguyen
(74) *Attorney, Agent, or Firm* — Vivacqua Crane, PLLC

(57) ABSTRACT

Disclosed are a three-dimensional imaging method, apparatus and device, and a storage medium. The three-dimensional imaging method may include: acquiring hardware configuration information of an electronic device and a ranging module supported by the electronic device; determining a ranging dot matrix density and a picture material pixel value according to the hardware configuration information of the electronic device; ranging on a plurality of points on an outer surface of a to-be-measured object by utilizing the ranging module according to the ranging dot matrix density, and obtaining depth information of the plurality of points; building a standard three-dimensional coordinate system according to the depth information of at least three points of the plurality of points; photographing
(Continued)

the to-be-measured object according to the picture material pixel value and obtaining a plurality of picture materials; and performing three-dimensional imaging processing on the to-be-measured object.

18 Claims, 9 Drawing Sheets

(58) Field of Classification Search
CPC .. G06T 17/00; G06T 7/50; G06T 9/00; G06T 15/506; G06T 7/55; G06T 7/557; G06T 7/586
See application file for complete search history.

(56) References Cited

U.S. PATENT DOCUMENTS

| | | |
|---|---|---|
| 2013/0235165 A1 | 9/2013 | Gharib et al. |
| 2015/0222875 A1* | 8/2015 | Fernandez .............. G06T 17/00 348/46 |

FOREIGN PATENT DOCUMENTS

| | | |
|---|---|---|
| CN | 107454377 A | 12/2017 |
| CN | 111121722 A | 5/2020 |
| WO | 2020069049 A1 | 4/2020 |

* cited by examiner

THREE-DIMENSIONAL IMAGING METHOD, APPARATUS, AND DEVICE, AND STORAGE MEDIUM

CROSS-REFERENCE TO RELATED APPLICATION

This application is a national stage filing under 35 U.S.C. § 371 of international application number PCT/CN2022/079988, filed Mar. 9, 2022, which claims priority to Chinese patent application No. 202110474587.X, filed Apr. 29, 2021. The contents of these applications are incorporated herein by reference in their entirety.

TECHNICAL FIELD

Embodiments of the present disclosure relate to the technical field of communication, and more particularly, to a three-dimensional imaging method, apparatus and device, and a storage medium.

BACKGROUND

With the rise of Virtual Reality (VR) technology and Augmented Reality (AR) technology, in order to seize the AR/VR market and attract more users, some smart mobile device suppliers have implanted a lidar module in some electronic devices to realize three-dimensional (3D) digital imaging of an object or scene in real world, such that the electronic devices having the lidar module can be applied to AR scene reconstruction and VR object scanning.

However, three-dimensional imaging methods also have many defects. Especially in an application scenario of VR modeling integration, because a photographing position of an electronic device relative to a to-be-measured object is not fixed, a measurement result obtained based on a plurality of photographing results has a large cumulative error, leading to an imprecise size of the to-be-measured object in the final three-dimensional imaging, or even resulting in that the to-be-measured object in the final three-dimensional imaging is incomplete.

SUMMARY

An embodiment of the present disclosure provides a three-dimensional imaging method. The method includes: acquiring hardware configuration information of an electronic device and a ranging module supported by the electronic device; determining a ranging dot matrix density and a picture material pixel value according to the hardware configuration information of the electronic device; ranging on a plurality of points on an outer surface of a to-be-measured object by utilizing the ranging module according to the ranging dot matrix density, and obtaining depth information of the plurality of points; building a standard three-dimensional coordinate system according to the depth information of at least three points of the plurality of points; photographing the to-be-measured object according to the picture material pixel value and obtaining a plurality of picture materials; and performing three-dimensional imaging processing on the to-be-measured object according to the standard three-dimensional coordinate system, the depth information of the plurality of points, and the plurality of picture materials.

An embodiment of the present disclosure provides a three-dimensional imaging device. The device includes: at least one processor; and a memory communicatively connected to the at least one processor, wherein the memory stores an instruction executable by the at least one processor which, executed by the at least one processor, causes the at least one processor to implement the above three-dimensional imaging method.

An embodiment of the present disclosure provides a computer-readable storage medium, storing a computer program which, when executed by a processor, causes the processor to implement the above three-dimensional imaging method.

BRIEF DESCRIPTION OF DRAWINGS

One or more embodiments are illustrated in conjunction with the corresponding drawings and these illustrative descriptions are not intended to constitute a limitation to the embodiments.

DETAILED DESCRIPTION

An objective of embodiments of the present disclosure is to provide a three-dimensional imaging method, apparatus and device, and a storage medium, to at least resolve the above technical problems related to three-dimensional imaging.

To make the objectives, technical schemes and advantages of the embodiments of the present disclosure clear, the embodiments of the present disclosure will be described in detail below in conjunction with the drawings. It may be understood by those having ordinary skills in the art that, various embodiments of the present disclosure provide many technical details to make readers better understand the present disclosure. However, the technical schemes claimed in the present disclosure can still be realized even without these technical details and various variations and modifications made based on the following embodiments. The following embodiments are divided for convenience of description and are not intended to constitute any limitation to the specific implementations of the present disclosure. The embodiments may be combined or used as references for each other if not in collision.

Figure 1:
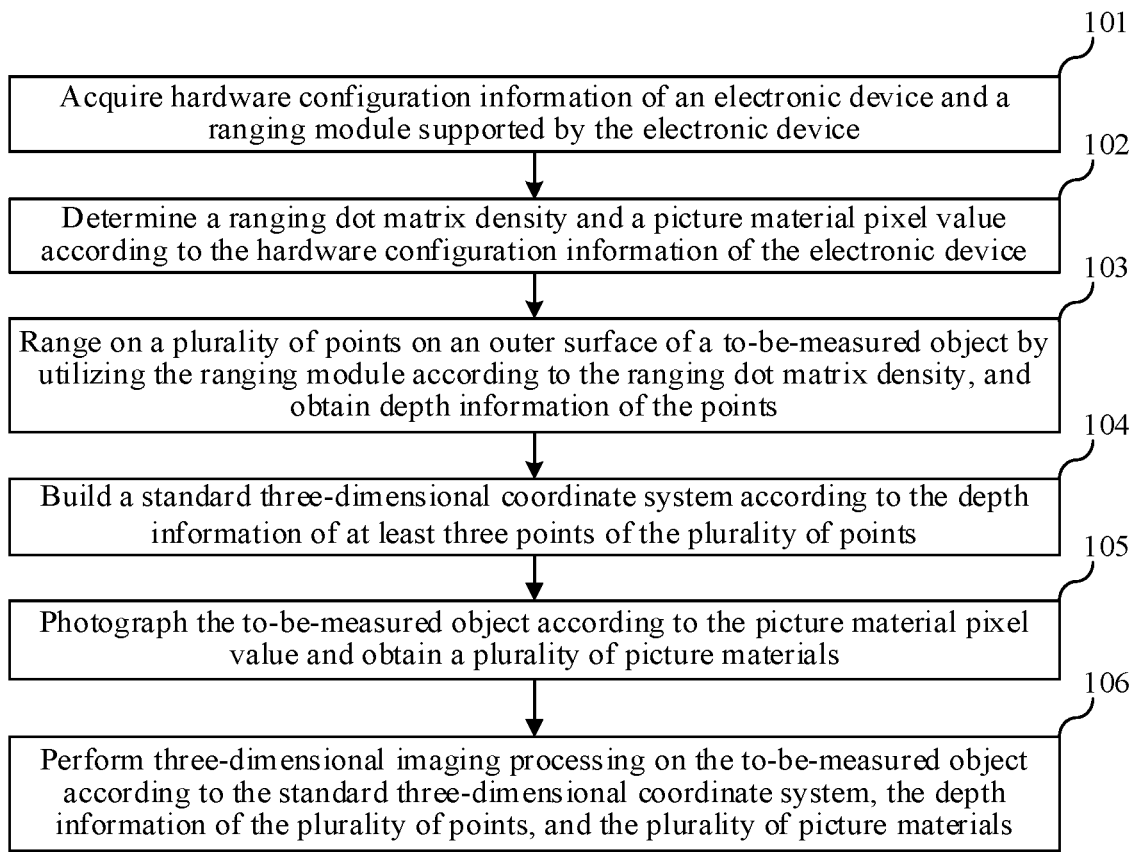
FIG. 1 is a schematic flowchart one of a three-dimensional imaging method according to an embodiment of the present disclosure.

An embodiment of the present disclosure relates to a three-dimensional imaging method. The process flow is shown in FIG. 1, which may include, but not limited to, the following steps.

At a step 101, hardware configuration information of an electronic device and a ranging module supported by the electronic device are acquired.

At a step 102, a ranging dot matrix density and a picture material pixel value are determined according to the hardware configuration information of the electronic device.

At a step 103, ranging is performed on a plurality of points on an outer surface of a to-be-measured object by utilizing the ranging module according to the ranging dot matrix density, to obtain depth information of the plurality of points.

At a step 104, a standard three-dimensional coordinate system is built according to the depth information of at least three points of the plurality of points.

At a step 105, the to-be-measured object is photographed according to the picture material pixel value to obtain a plurality of picture materials.

At a step 106, three-dimensional imaging processing is performed on the to-be-measured object according to the standard three-dimensional coordinate system, the depth information of the plurality of points, and the plurality of picture materials.

In this embodiment, to implement three-dimensional imaging, hardware configuration information of an electronic device and a ranging module supported by the electronic device are acquired. A ranging dot matrix density and a picture material pixel value are determined according to the hardware configuration information of the electronic device. A to-be-measured object is photographed according to the determined picture material pixel value, to ensure that a plurality of picture materials obtained meet a requirement of the picture material pixel value. Points on an outer surface of the to-be-measured object that need to be subjected to ranging are determined according to the determined ranging dot matrix density, and ranging is performed on the determined points on the outer surface of the to-be-measured object using the supported ranging module to obtain depth information of the plurality of points. Then, a standard coordinate system is built using the depth information of at least three points selected from the points. Finally, three-dimensional imaging processing is implemented on the to-be-measured object according to the built standard coordinate system, the depth information of the plurality of points obtained according to the determined ranging dot matrix density, and the plurality of picture materials obtained according to the determined picture material pixel value. Thus, at least an accumulative error caused by the change of acquisition position is resolved, such that the final three-dimensional imaging result can restore the to-be-measured object as much as possible, i.e., the absolute size of three-dimensional imaging is more precise, allowing VR 3D products to be more versatile.

Another embodiment of the present disclosure relates to a three-dimensional imaging method, which is applied to electronic devices having a photographing function that are popular at present, such as a mobile phone, a tablet computer, and the like.

Existing ranging and imaging methods using a laser projection measurement system are greatly interfered by environmental brightness. For example, the three-dimensional scanning effect is favorable in a dark environment, and the calculation effect of spot projection is unsatisfactory in a bright environment due to the interference of bright light. In addition, the use of the laser projection measurement system needs to rely on a lidar module, and usually, the lidar module needs to be implanted into the electronic device in advance.

However, most of the electronic devices available on the market are not equipped with the lidar module at present. As a result, only the electronic devices equipped with the lidar module can implement the three-dimensional scanning imaging operation, and ordinary individual users who do not have an electronic device equipped with the lidar module are unable to use the existing devices to realize this function.

In addition, the cost of implanting the lidar module in the electronic device is relatively high. Therefore, the existing three-dimensional scanning imaging methods have an unsatisfactory effect, and cannot be popularized among ordinary individual users.

In view of the above, this embodiment provides three-dimensional imaging, which is applicable to popular electronic devices at present and does not require the electronic device to be equipped with a lidar module, thereby lowering hardware requirements of 3D modeling as much as possible, and facilitating the popularization of 3D acquisition among ordinary individual users.

Implementation details of the three-dimensional imaging method of this embodiment will be described below and the following implementation details are provided only for convenience of understanding, and are not necessary for implementing the present scheme.

Figure 2:
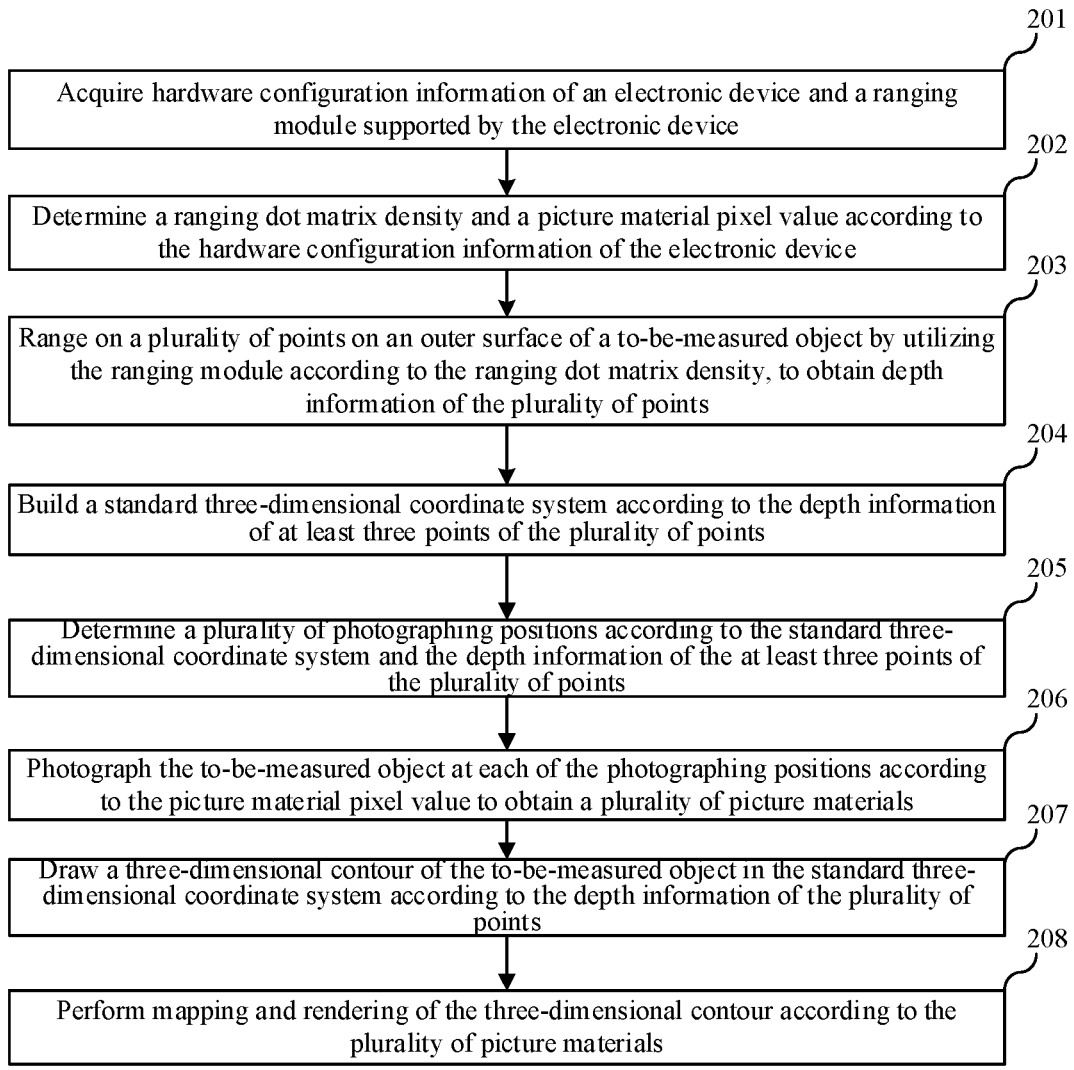
FIG. 2 is a schematic flowchart two of a three-dimensional imaging method according to another embodiment of the present disclosure.

FIG. 2 is a flowchart of the three-dimensional imaging method according to this embodiment, including the following steps.

At a step 201, hardware configuration information of an electronic device and a ranging module supported by the electronic device are acquired.

The hardware configuration information of the electronic device and the ranging module supported by the electronic device may be acquired through a pre-compiled hardware configuration information acquisition script file or a corresponding function.

It can be understood that, in practical applications, the pre-compiled hardware configuration information acquisition script file or the function may be pre-loaded into a program for implementing the three-dimensional imaging method of this embodiment before the electronic device implements three-dimensional imaging, or may be dynamically called when receiving a three-dimensional imaging instruction after the program for implementing the three-dimensional imaging method is started, to implement the operation of acquiring the hardware configuration information of the electronic device and the ranging module supported by the electronic device, and finally obtain the hardware configuration information of the electronic device and the ranging module supported by the electronic device.

In addition, the hardware configuration information of the electronic device in this embodiment needs to include at least information of a network capability and an image processing capability of the electronic device, such as, but not limited to, a Central Processing Unit (CPU)/Graphics Processing Unit (GPU) model, a memory size, hard disk usage, network card driver information, and the like.

In addition, it should be noted that in practical applications, ranging modules supported by the electronic device in this embodiment may be roughly divided into two categories: an optical ranging module and a wireless ranging module.

The optical ranging module capable of implementing the three-dimensional imaging method of this embodiment may be a lidar module or an ordinary camera module. The wireless ranging module may be a millimeter wave ranging component, an ultrasonic ranging component, an Ultra Wide Band (UWB) ranging component, or other wireless ranging components with strong penetration, low power consumption, good anti-interference effect, high security, large memory space, and precise positioning.

In addition, it is to be noted that in practical applications, when it is identified based on the ranging module supported by the electronic device that the electronic device only includes an optical ranging module, it is necessary to further determine whether the optical ranging module included in the electronic device is a lidar module such as a lidar camera, or an ordinary camera module that currently only has a photographing function, i.e., an ordinary camera.

In an example embodiment, if the optical ranging module is a lidar camera, ranging and three-dimensional imaging can be realized using a minimum of one lidar camera, i.e., an existing lidar camera-based three-dimensional imaging method can be achieved; while if the optical ranging module is an ordinary camera, at least two ordinary cameras are required to implement binocular ranging.

In other words, the ranging module supported by the electronic device in this embodiment includes at least one of: at least one lidar module, at least two visible light camera modules, a UWB ranging component, or a millimeter wave ranging component.

It can be understood that, in practical applications, the wireless ranging component mentioned above may be a sensor, a radar, or the like that can realize the above functions.

In addition, it is to be noted that in practical applications, a number of optical ranging labels may be attached to the outer surface of the to-be-measured object, for use in combination with the optical ranging module to implement ranging.

Correspondingly, a number of wireless ranging labels may also be attached to the outer surface of the to-be-measured object, for use in combination with the wireless ranging module to implement ranging.

In addition, in practical applications, the optical ranging labels and the wireless ranging labels may be integrated, i.e., only integrated optical/wireless ranging labels are attached to the outer surface of the to-be-measured object, and the integrated optical/wireless ranging labels not only can be used in combination with an electronic device supporting the optical ranging module to implement optical ranging, but also can be used in combination with an electronic device supporting the wireless ranging module to implement wireless ranging.

The number of optical ranging labels, wireless ranging labels, and integrated optical/wireless ranging labels can be determined according to specific service requirements, which is not limited in this embodiment.

It should be understood that the above examples are merely provided for a better understanding of the technical schemes of this embodiment and are not intended to limit this embodiment.

Based on the above description, it can be seen that the three-dimensional imaging method provided by this embodiment is applicable not only to electronic devices having a lidar module, but also to existing electronic devices having a plurality of ordinary cameras and electronic devices having a wireless ranging module such as a UWB ranging module, a millimeter wave ranging module, and the like.

In other words, the three-dimensional imaging method provided by this embodiment can be applied to most electronic devices currently available on the market, thereby greatly lowering the hardware requirements of VR/AR scenes and facilitating the popularization of three-dimensional imaging.

At a step 202, a ranging dot matrix density and a picture material pixel value are determined according to the hardware configuration information of the electronic device.

In this embodiment, a pre-compiled performance test program is called to determine a predicted network capability value and a predicted image processing capability value corresponding to the hardware configuration information, and then determine the ranging dot matrix density and the picture material pixel value according to the determined predicted network capability value and the predicted image processing capability value.

A process of calling the pre-compiled performance test program to determine the ranging dot matrix density and the picture material pixel value may be as follows. The pre-compiled performance test program is called to repeatedly send out preset three-dimensional image files of different sizes in a preset period. The three-dimensional image files of different sizes may be three-dimensional image files formed by constructing three-dimensional profiles of the to-be-measured object according to the depth information determined based on different ranging dot matrix densities and performing mapping and rendering of the three-dimensional profiles according to picture materials having different picture material pixel values. In this way, it can be obtained which ranging dot matrix density and picture material pixel value corresponding to the current hardware configuration information can be used to form a three-dimensional image having a highest overall score.

It should be understood that the above examples are merely provided for a better understanding of the technical schemes of this embodiment and are not intended to limit this embodiment.

At a step 203, ranging is performed on a plurality of points on an outer surface of a to-be-measured object by utilizing the ranging module according to the ranging dot matrix density, to obtain depth information of the plurality of points.

From the above description, it can be seen that in the three-dimensional imaging method provided by this embodiment, ranging may be performed on the points on the outer surface of the to-be-measured object by utilizing the optical ranging module alone, the wireless ranging module alone, or both the optical ranging module and the wireless ranging module, to obtain the depth information of the plurality of points.

Therefore, when it is determined that the ranging module supported by the electronic device is a lidar camera, ranging is directly performed based on a ranging principle of the lidar camera on the points on the outer surface of the to-be-measured object that are determined according to the ranging dot matrix density, to obtain the depth information of the plurality of points.

Correspondingly, when it is determined that the ranging module supported by the electronic device is at least two ordinary cameras, ranging is performed based on a principle of binocular ranging on the points on the outer surface of the to-be-measured object that are determined according to the ranging dot matrix density, to obtain the depth information of the plurality of points.

Correspondingly, when it is determined that the ranging module supported by the electronic device is a wireless ranging module such as a millimeter wave ranging component, an ultrasonic ranging component, or a UWB ranging component, ranging is performed based on a corresponding wireless ranging principle on the points on the outer surface of the to-be-measured object that are determined according to the ranging dot matrix density, to obtain the depth information of the plurality of points.

Correspondingly, when the ranging module supported by the electronic device includes at least any two of at least one lidar module, at least two visible light camera modules, a UWB ranging component, or a millimeter wave ranging component, ranging needs to be performed on the plurality of points on the outer surface of the to-be-measured object by utilizing each of the supported ranging modules according to the ranging dot matrix density, to obtain the depth information of each of the plurality of points measured respectively by each of the ranging modules.

For example, when the electronic device has two ordinary cameras and a built-in UWB component, two pieces of depth information are obtained for each of points A, B, and C on the outer surface of the to-be-measured object in two ways. For example, for point A, depth information A1 is obtained based on binocular ranging, and depth information A2 is obtained based on ranging using the UWB component. Similarly, for points B and C, depth information B1 and C1 is respectively obtained based on binocular ranging, and depth information B2 and C2 is respectively obtained based on ranging using the UWB component.

At a step 204, a standard three-dimensional coordinate system is built according to the depth information of at least three points of the plurality of points.

It can be understood that, the coordinates of the points on the outer surface of the to-be-measured object are basically fixed in a three-dimensional space because the to-be-measured object is usually stationary. The depth information contains position information of the corresponding point. Therefore, in this embodiment, a stable standard three-dimensional coordinate system can be constructed using the fixed position information, and therefore the to-be-measured object can be restored more accurately and truly through three-dimensional imaging based on the standard three-dimensional coordinate system.

In addition, it can be understood that, because the three-dimensional coordinate system is composed of an X axis, a Y axis and a Z axis, building a standard three-dimensional coordinate system requires at least position information of three points on the outer surface of the to-be-measured object in practical applications. To be specific, during building of a standard three-dimensional coordinate system based on position information, at least three points need to be selected from the points of which depth information has been obtained, and then the standard three-dimensional coordinate system is built based on position information included in the depth information of the selected at least three points.

For ease of understanding, this embodiment is described in detail with reference to FIG. 3 by way of an example where three points are selected.

Figure 3:
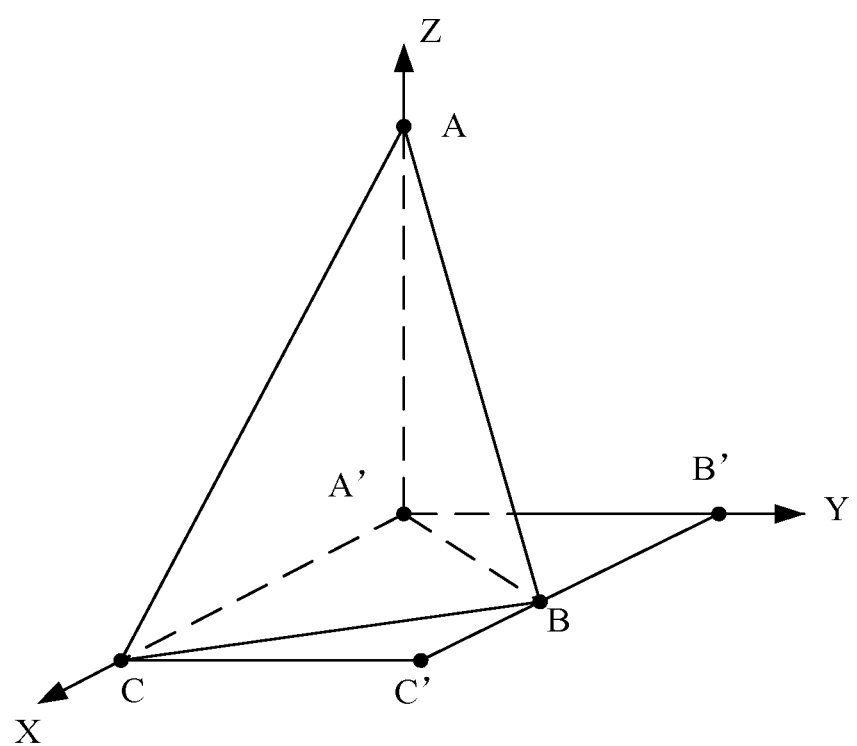
FIG. 3 is a schematic diagram of a standard three-dimensional coordinate system built in step 204 in the three-dimensional imaging method according to the embodiment shown in FIG. 2.

As shown in FIG. 3, points A, B, and C are the selected points of which depth information has been measured, and points A', B', and C' are projections of the points A, B, and C, respectively. A three-dimensional coordinate system can be built based on the points A, B, C, A', B', and C'. After the three-dimensional coordinate system is obtained, a standard three-dimensional coordinate system can be obtained by selecting the coordinate axis perpendicular to the horizontal plane as the Z axis and designating the remaining two coordinate axes as the X axis and the Y axis.

As shown in FIG. 3, the coordinate axis where the point A lies is the Z axis, the coordinate axis where the point C lies is the X axis, and the coordinate axis where the projection B' corresponding to the point B lies is the Y axis.

It should be understood that the above examples are merely provided for a better understanding of the technical schemes of this embodiment and are not intended to limit this embodiment.

In addition, it should be noted that to improve the precision of the built standard three-dimensional coordinate system as much as possible to ensure that the final three-dimensional imaging can precisely restore the to-be-measured object, if the number of selected points is greater than 3 in practical applications, the standard three-dimensional coordinate system is built in the following manner.

(1) A reference three-dimensional coordinate system is built based on position information of every three points.

Assuming that there are 4 selected points, namely, points A, B, C, and D, the following four reference three-dimensional coordinate systems can be obtained by building a reference three-dimensional coordinate system based on the position information of every three points:

a first reference three-dimensional coordinate system: A, B, and C;

a second reference three-dimensional coordinate system: A, B, and D;

a third reference three-dimensional coordinate system: A, C, and D; and a fourth reference three-dimensional coordinate system: B, C, and D.

It can be understood that in practical applications, the reference three-dimensional coordinate systems do not indicate a precedence order.

(2) One of the obtained reference three-dimensional coordinate systems is selected as an initial standard three-dimensional coordinate system, and the remaining reference three-dimensional coordinate systems are used as calibration three-dimensional coordinate systems.

For example, when the first reference three-dimensional coordinate system is selected from the above four reference three-dimensional coordinate systems as the initial standard three-dimensional coordinate system, the remaining three reference three-dimensional coordinate systems are used as calibration three-dimensional coordinate systems.

(3) The initial standard three-dimensional coordinate system is calibrated using the calibration three-dimensional coordinate systems to obtain the standard three-dimensional coordinate system.

Repeated alignment and angle adjustment are continuously performed on the initial standard three-dimensional coordinate system according to the three calibration three-dimensional coordinate systems, to finally obtain a stable standard three-dimensional coordinate system.

Based on this, a standard three-dimensional coordinate system is obtained by calibrating and aligning a three-dimensional coordinate system built based on the position information of any three points, such that subsequent three-dimensional imaging based on the coordinate system can more truly restore the actual status of the to-be-measured object.

It can be understood that the manner of building a standard three-dimensional coordinate system according to depth information of at least three points is for cases involving one type of ranging module. If the electronic device supports at least two types of ranging modules mentioned above in practical applications, a three-dimensional coordinate system can be built by this manner according to depth information measured by respective types of ranging modules. In this case, the three-dimensional coordinate system corresponding to each type of ranging module is referred to as an initial coordinate system. To be specific, for each type of ranging module supported, an initial three-dimensional coordinate system is built according to the depth information of at least three points of the plurality of points. Then, the obtained initial three-dimensional coordinate systems are superimposed, and a position error is subtracted through averaging, to obtain the standard three-dimensional coordinate system. In this way, the accuracy of the built standard three-dimensional coordinate system is further ensured.

In addition, it is to be noted that for the selection of at least three points for constructing a standard three-dimensional coordinate system, three points are selected as an example. In practical applications, the three points may be arbitrarily determined, or may be three points distributed in different regions on the outer surface of the to-be-measured object and meeting an accuracy requirement of final three-dimensional imaging.

In this embodiment, the phrase "different regions" means that the shape of a surface formed by the selected three points needs to be similar to the shape of the outer surface of the to-be-measured object where the three points are located. For example, if the outer surface of the to-be-measured object is in the shape of a triangle, the selected three points need to be points distributed in regions where the three angles are located.

At a step 205, a plurality of photographing positions are determined according to the standard three-dimensional coordinate system and the depth information of the at least three points.

To ensure that the electronic device can photograph every region on the outer surface of the to-be-measured object, several photographing positions corresponding to different regions of the to-be-measured object can be determined according to the standard three-dimensional coordinate system and the position information of the three points for building the standard three-dimensional coordinate system after the standard three-dimensional coordinate system is obtained. In this way, at each of the plurality of photographing positions, the electronic device can capture a picture material of a region on the outer surface of the to-be-measured object, thereby ensuring a complete and accurate three-dimensional imaging of the to-be-measured object based on the standard three-dimensional coordinate system, the obtained depth information of the plurality of points, and the picture materials.

It should be understood that each of the plurality of photographing positions corresponds to one region on the outer surface of the to-be-measured object, and in practical applications, the regions on the outer surface of the to-be-measured object that correspond to different photographing positions may partially overlap or completely overlap each other (but at different angles), or have no overlapping part.

In addition, it can be understood that the photographing position is the position at which the electronic device finally photographs the to-be-measured object. To restore the to-be-measured object as much as possible, the determined photographing position needs to ensure that the electronic device at this position can photograph characteristic information of the to-be-measured object as clearly as possible.

In an example where the ranging module is a wireless ranging module and a plurality of integrated optical/wireless ranging labels are attached to the outer surface of the to-be-measured object, the determined photographing position needs to ensure that the electronic device at this position can clearly photograph the integrated optical/wireless ranging labels on the surface of the to-be-measured object corresponding to the photographing position.

In addition, it can be understood that because the to-be-measured object is often three-dimensional, usually more than one photographing position is determined, to ensure that the final 3D imaging effect can restore the to-be-measured object as truly as possible. To be specific, photographing positions may be set around the to-be-measured object.

For better understanding, the manner of determining the photographing position is described below with reference to FIG. 4.

In this embodiment, the photographing position is determined by the built standard three-dimensional coordinate system and the position information of the at least three points for building the standard three-dimensional coordinate system.

Figure 4:
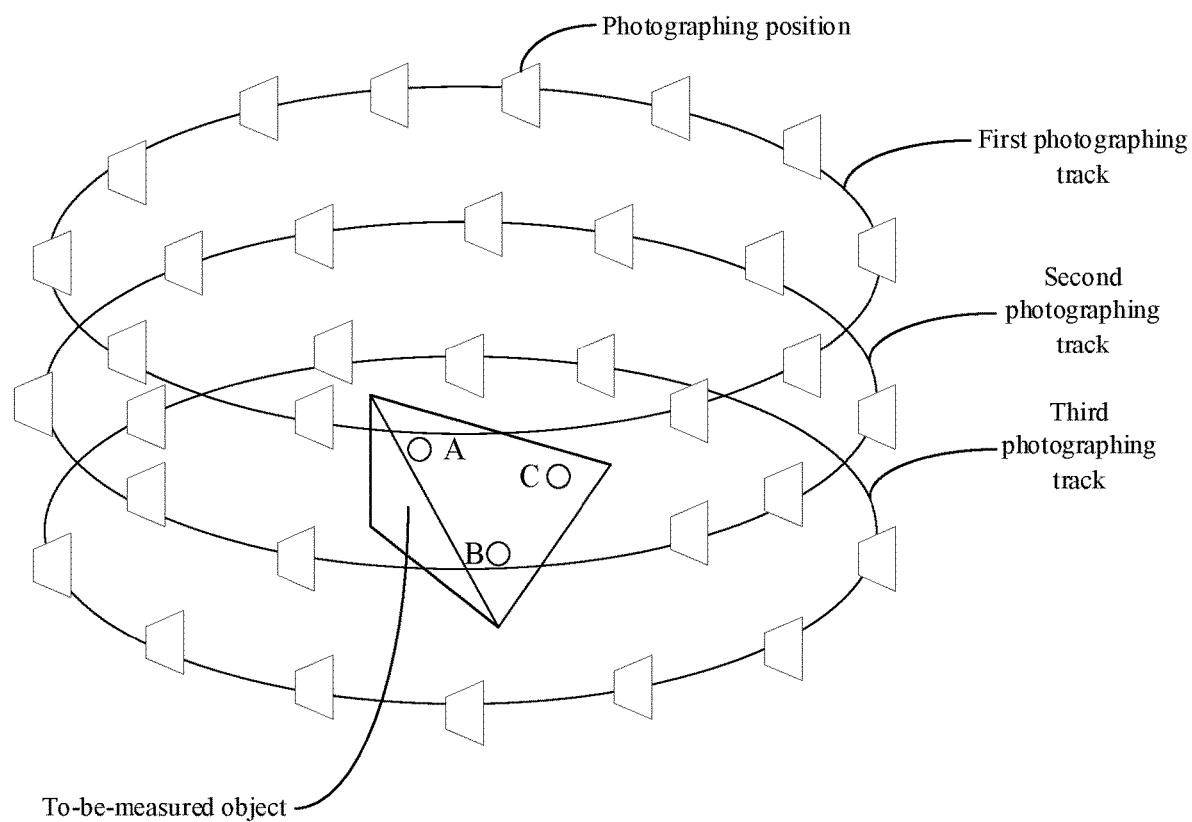
FIG. 4 is a schematic diagram of determining a photographing position in step 205 in the three-dimensional imaging method according to the embodiment shown in FIG. 2.

As shown in FIG. 4, when the selected points are still the three points A, B, and C, three groups of photographing positions may be determined.

Assuming that the plurality of photographing positions are determined based on horizontal positions shown in FIG. 4, three groups of photographing positions are determined. Three photographing tracks, i.e., three horizontal photographing tracks in FIG. 4, are determined by utilizing coordinate positions of the points A, B, and C on the Z axis as horizontal positions, respectively. In practical applications, three photographing tracks may be constructed on the Y axis, or three photographing tracks may be constructed on the X axis, or a preset number of photographing tracks may be constructed on each of the X axis, the Y axis, and the Z axis, which is not limited in this embodiment.

Then, each photographing track is divided based on a preset interval to obtain a plurality of photographing positions.

As shown in FIG. 4, a plurality of photographing positions are determined on each of a first photographing track, a second photographing track, and a third photographing track.

It should be understood that the above examples are merely provided for a better understanding of the technical schemes of this embodiment and are not intended to limit this embodiment.

At a step 206, the to-be-measured object is photographed at each of the plurality of photographing positions according to the picture material pixel value to obtain a plurality of picture materials.

It can be seen from step 205 that a plurality of photographing positions are finally determined. Therefore, in fact, photographing the to-be-measured object at the plurality of photographing positions means that the electronic device is moved to each photographing position to photograph the to-be-measured object, so as to obtain a picture material of the to-be-measured object corresponding to the photographing position.

Photographing the to-be-measured object according to the picture material pixel value means determining, according to the picture material pixel value, a pixel size that the finally obtained picture material needs to meet, and then determining a resolution to be used for photographing to obtain the picture material. In this way, the electronic device is controlled to photograph the to-be-measured object according to the determined resolution, so as to ensure that the pixel size of the picture material finally obtained through photographing satisfies the picture material pixel value.

In addition, it can be understood that in practical applications, even at the same photographing position, the picture material obtained through photographing by a camera of the electronic device varies with a photographing angle, a focal length, etc. Therefore, to ensure that the obtained picture material can clearly reflect characteristic information such as various ranging labels on the surface of the to-be-measured object corresponding to the photographing position as much as possible, position information of a ranging label corresponding to each respective photographing position needs to be determined before the to-be-measured object is photographed. Then, the photographing angle is adjusted according to each respective photographing position and the position information of the ranging label corresponding to each respective photographing position, and the to-be-measured object is photographed according to the picture material pixel value at each of the adjusted photographing angles, thereby obtaining a plurality of picture materials with pixel size meeting the picture material pixel value.

It can be understood that, the ranging labels are arranged in advance on the outer surface of the to-be-measured object. Therefore, determining position information of a ranging label corresponding to each respective photographing position includes first determining the outer surface of the to-be-measured object facing each photographing position and then determining the position information of the ranging label arranged on the outer surface and facing the corresponding photographing position.

In addition, in practical applications, to facilitate user operations as much as possible, a visual interactive interface may be provided to display the built standard three-dimensional coordinate system. Longitude and latitude junctions of an imaginary sphere formed based on the standard three-dimensional coordinate system are determined as the plurality of photographing positions. The electronic device is guided to move to each photographing position in the visual interactive interface, with a central normal of the camera of the electronic device being aligned with the center of the imaginary sphere. Then, the camera performs photographing to obtain picture materials.

In addition, it is to be noted that to ensure the reference value of the picture material, the ranging labels such as UWB ranging labels arranged on every side of the to-be-measured object may be of a color significantly different from the color of the to-be-measured object, such that the ranging labels can be better identified under strong light to ensure the final imaging effect.

At a step 207, a three-dimensional profile of the to-be-measured object is drawn in the standard three-dimensional coordinate system according to the depth information of the plurality of points.

Figure 5:
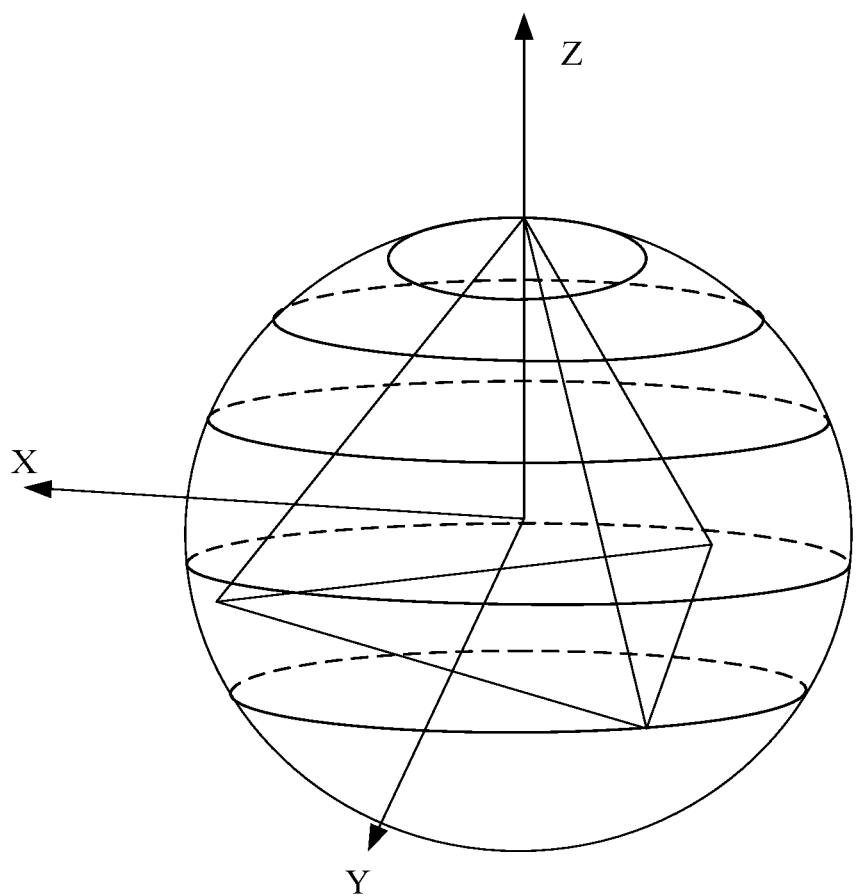
FIG. 5 is a schematic diagram of a three-dimensional profile drawn in the standard three-dimensional coordinate system in step 204 in the three-dimensional imaging method according to the embodiment shown in FIG. 2.

As shown in FIG. 5, assuming that the to-be-measured object is a triangular pyramid, a three-dimensional profile of the to-be-measured object can be obtained by marking spatial coordinates of a plurality of points in the standard three-dimensional coordinate system based on position information in depth information of the plurality of points.

In addition, it is to be noted that in practical applications, drawing a three-dimensional profile of the to-be-measured object in the standard three-dimensional coordinate system according to the depth information of the plurality of points may include drawing the three-dimensional profile of the to-be-measured object according to the depth information of each of the points or the depth information of some of the points depending on an accuracy requirement of three-dimensional imaging.

It can be understood that the more points are used for drawing the contour, the more precisely the drawn three-dimensional profile can restore the to-be-measured object.

At a step 208, mapping and rendering of the three-dimensional profile are performed according to the plurality of picture materials.

To be specific, performing mapping and rendering of the three-dimensional profile according to the plurality of picture materials includes extracting characteristic information such as color of the to-be-measured object from each picture material, and then performing mapping and rendering of the three-dimensional profile of the to-be-measured object drawn in the standard three-dimensional coordinate system. In this way, the to-be-measured object can be truly and accurately restored, i.e., 3D imaging of the to-be-measured object can be realized.

In this embodiment, because the ranging module is not limited to a lidar module implanted in the electronic device, and a plurality of ordinary cameras or a wireless ranging component already equipped in the existing electronic device can also be used to perform ranging on points on the outer surface of the to-be-measured object, hardware requirements of the 3D modeling function are greatly lowered, which facilitates the popularization of 3D acquisition. Moreover, through the cooperation of the optical ranging module and the wireless ranging module, the precision of three-dimensional imaging is further improved.

In addition, according to the three-dimensional imaging method provided by this embodiment, the acquisition of the depth information of the plurality of points on the outer surface of the to-be-measured object and the picture materials of the to-be-measured object is based on the ranging dot matrix density and the picture material pixel value that are determined by the hardware configuration information supported by the electronic device, such that both the three-dimensional imaging speed and the final three-dimensional imaging effect of the electronic device are ensured, without occupying too many hardware resources of the electronic device and affecting the processing of other services by the electronic device.

Figure 6:
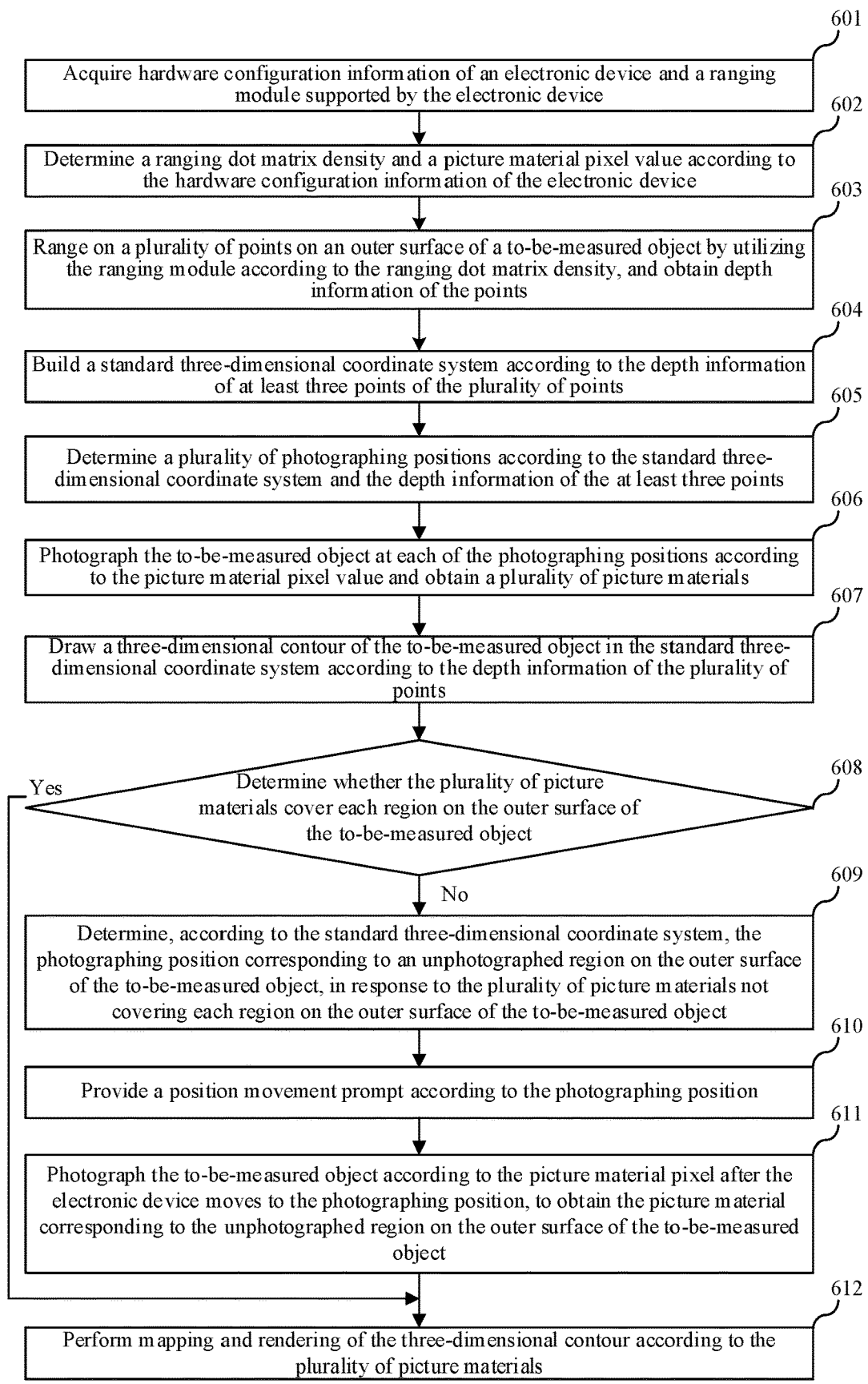
FIG. 6 is a schematic flowchart three of a three-dimensional imaging method according to another embodiment of the present disclosure.

Another embodiment of the present disclosure relates to a three-dimensional imaging method, which includes a process flow as shown in FIG. 6.

At a step 601, hardware configuration information of an electronic device and a ranging module supported by the electronic device are acquired.

At a step 602, a ranging dot matrix density and a picture material pixel value are determined according to the hardware configuration information of the electronic device.

At a step 603, ranging is performed on a plurality of points on an outer surface of a to-be-measured object by utilizing the ranging module according to the ranging dot matrix density, to obtain depth information of the plurality of points.

At a step 604, a standard three-dimensional coordinate system is built according to the depth information of at least three points of the plurality of points.

At a step 605, a plurality of photographing positions are determined according to the standard three-dimensional coordinate system and the depth information of the at least three points.

At a step 606, the to-be-measured object is photographed at each of the plurality of photographing positions according to the picture material pixel value to obtain a plurality of picture materials.

At a step 607, a three-dimensional profile of the to-be-measured object is drawn in the standard three-dimensional coordinate system according to the depth information of the plurality of points.

It can be seen that steps 601 to 607 in this embodiment are substantially the same as steps 201 to 207 in the second embodiment, so the details will not be repeated herein.

At a step 608, it is determined whether the plurality of picture materials cover each region on the outer surface of the to-be-measured object.

In addition, it is to be noted that in practical applications, when a user holds the electronic device and moves during photographing, the user possibly cannot photograph the to-be-measured object according to the determined photographing positions during the photographing process. Therefore, to ensure the final three-dimensional imaging result for the to-be-measured object, it may be determined whether the current picture materials obtained through photographing cover each region on the outer surface of the to-be-measured object, before mapping and rendering of the three-dimensional profile are performed according to the plurality of picture materials.

If the current picture materials do not cover each region on the outer surface of the to-be-measured object, steps 609 to 611 are executed in sequence; otherwise, step 612 is directly executed.

At a step 609, the photographing position corresponding to an unphotographed region on the outer surface of the to-be-measured object is determined according to the standard three-dimensional coordinate system.

In this embodiment, the manner of determining, according to the standard three-dimensional coordinate system, the photographing position corresponding to the unphotographed region on the outer surface of the to-be-measured object is the same as the manner of determining the photographing position in step 205 in the second embodiment, so the details will not be repeated herein.

At a step of 610, a position movement prompt is provided according to the photographing position.

It can be understood that in practical applications, providing a position movement prompt according to the photographing position may include displaying a specific photographing position to be moved to in the interactive interface, or providing a voice prompt to prompt the user to move the electronic device to the photographing position.

At a step of 611, the to-be-measured object is photographed according to the picture material pixel value after the electronic device moves to the photographing position, to obtain the picture material corresponding to the unphotographed region on the outer surface of the to-be-measured object.

At a step of 612, mapping and rendering of the three-dimensional profile are performed according to the plurality of picture materials.

It can be seen that step 612 in this embodiment is substantially the same as step 208 in the second embodiment, so the details will not be repeated herein.

In this embodiment, before mapping and rendering of the three-dimensional profile are performed according to the plurality of picture materials, it is determined whether the current picture materials obtained through photographing cover each region on the outer surface of the to-be-measured object. If the current picture materials do not cover each region on the outer surface of the to-be-measured object, the photographing position corresponding to an unphotographed region on the outer surface of the to-be-measured object is determined according to the standard three-dimensional coordinate system. Then, a position movement prompt is provided according to the photographing position. The to-be-measured object is photographed according to the picture material pixel value after the electronic device moves to the photographing position, to obtain the picture material corresponding to the unphotographed region on the outer surface of the to-be-measured object. This ensures that the picture materials required for final mapping and rendering of the three-dimensional profile cover the characteristic information of each region on the outer surface of the measured object, such that the to-be-measured object can be completely restored.

Figure 7:
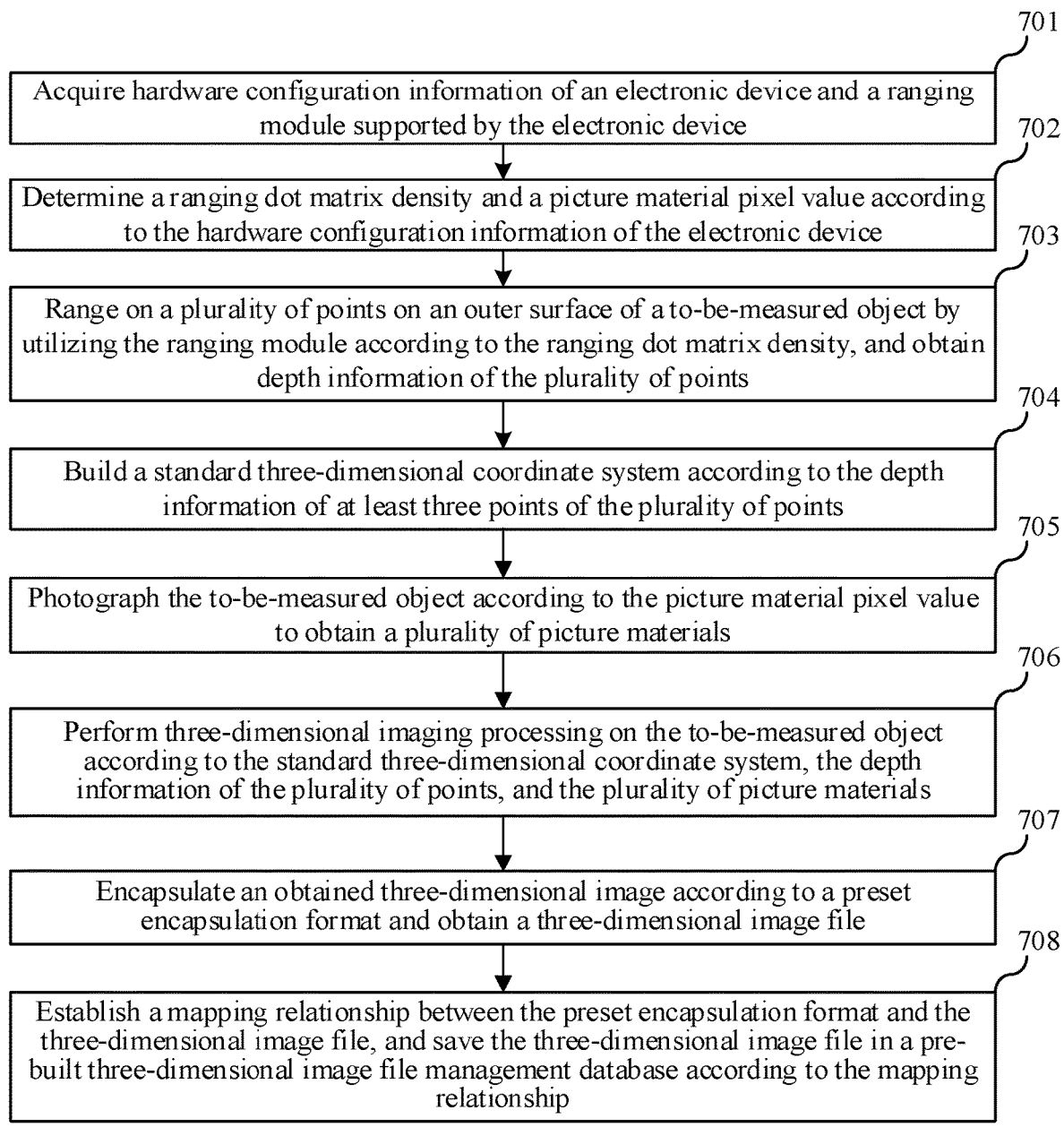
FIG. 7 is a schematic flowchart four of a three-dimensional imaging method according to another embodiment of the present disclosure.

Another embodiment of the present disclosure relates to a three-dimensional imaging method which includes a process flow as shown in FIG. 7.

At a step of 701, hardware configuration information of an electronic device and a ranging module supported by the electronic device are acquired.

At a step of 702, a ranging dot matrix density and a picture material pixel value are determined according to the hardware configuration information of the electronic device.

At a step of 703, ranging is performed on a plurality of points on an outer surface of a to-be-measured object by utilizing the ranging module according to the ranging dot matrix density, to obtain depth information of the plurality of points.

At a step of 704, a standard three-dimensional coordinate system is built according to the depth information of at least three points of the plurality of points.

At a step of 705, the to-be-measured object is photographed according to the picture material pixel value to obtain a plurality of picture materials.

At a step of 706, three-dimensional imaging processing is performed on the to-be-measured object according to the standard three-dimensional coordinate system, the depth information of the plurality of points, and the plurality of picture materials.

For details of steps 701 to 706 in this embodiment, reference may be made to any one of the foregoing method embodiments, so the details will not be repeated herein.

At a step of 707, an obtained three-dimensional image is encapsulated according to a preset encapsulation format to obtain a three-dimensional image file.

The preset encapsulation format in this embodiment is determined according to a transmission network type supported by the electronic device, such as a cellular network (3G, 4G, 5G) and Wireless Fidelity (Wi-Fi), and/or hardware configuration information of an electronic device receiving the three-dimensional image file. At least a resolution and a file size of the three-dimensional image file obtained through encapsulating are specified in the determined preset encapsulation format.

Correspondingly, when the resolution and the file size of the three-dimensional image file obtained through encapsulating are specified in the preset encapsulation format, encapsulating an obtained three-dimensional image according to a preset encapsulation format to obtain a three-dimensional image file includes:

encapsulating the obtained three-dimensional image according to the resolution and the file size specified by the preset encapsulation format to obtain the three-dimensional image file complying with the preset encapsulation format.

At a step of 708, a mapping relationship between the preset encapsulation format and the three-dimensional image file is established, and the three-dimensional image file is saved in a pre-built three-dimensional image file management database according to the mapping relationship.

In this embodiment, the preset encapsulation format and the three-dimensional image file are stored in the form of a key-value pair, with the content, e.g., the resolution and the file size, specified in the preset encapsulation format being taken as key, i.e., key={resolution, file size}, and the three-dimensional image file obtained through encapsulating according to the preset encapsulation format being taken as value.

In this embodiment, after the three-dimensional image file is obtained, the three-dimensional image file is classified according to the transmission network type specified in the preset encapsulation format, subjected to a circulation analysis according to the hardware configuration information of the electronic device receiving the three-dimensional image file, encapsulated according to a unified encapsulation method, and then stored in the dedicated three-dimensional image file management database, such that the obtained three-dimensional image can adapt to different application scenarios, thereby improving universality of the three-dimensional image for later use.

Figure 8:
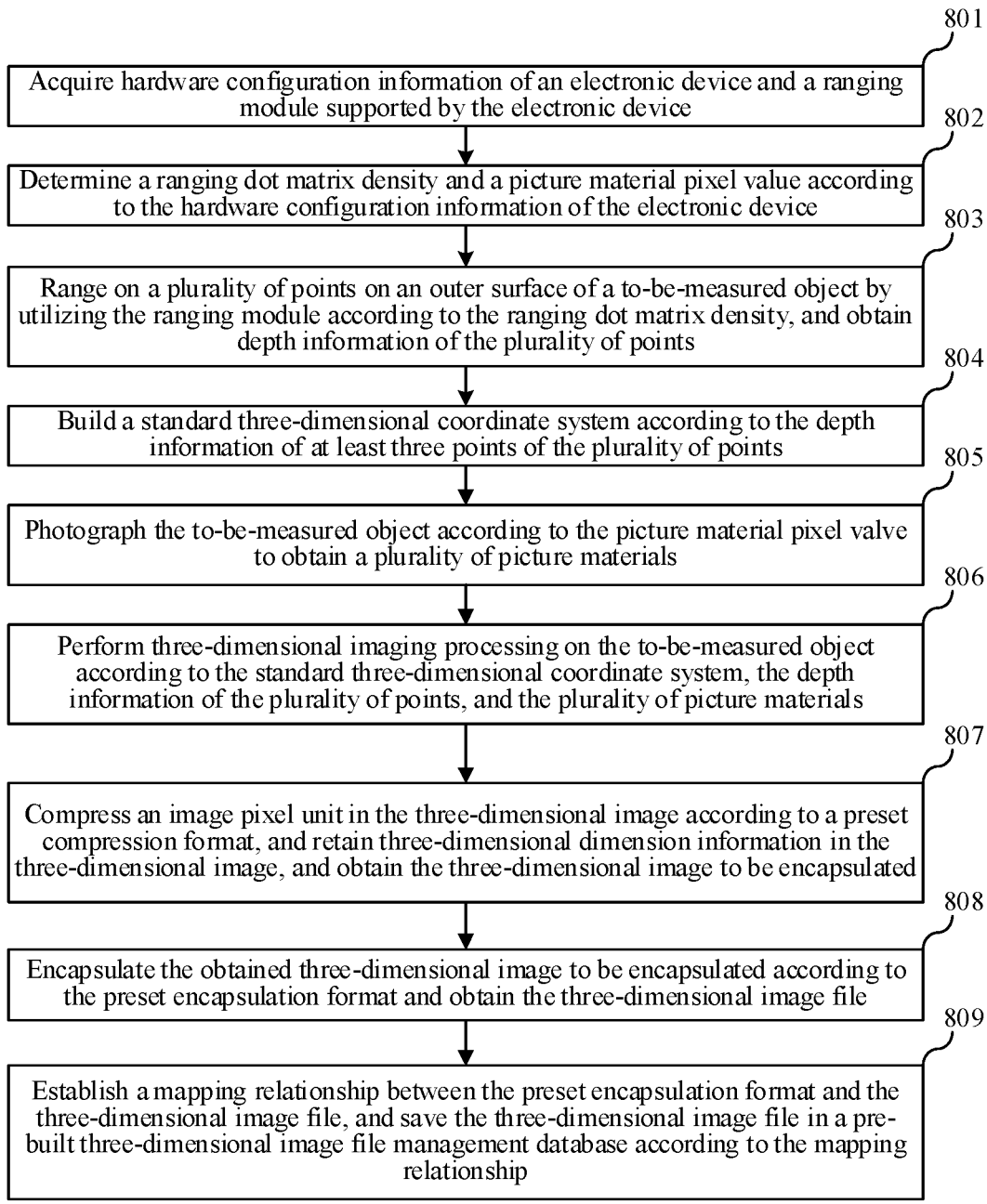
FIG. 8 is a schematic flowchart five of a three-dimensional imaging method according to another embodiment of the present disclosure.

Another embodiment of the present disclosure relates to a three-dimensional imaging method which includes a process flow as shown in FIG. 8.

At a step of 801, hardware configuration information of an electronic device and a ranging module supported by the electronic device are acquired.

At a step of 802, a ranging dot matrix density and a picture material pixel value are determined according to the hardware configuration information of the electronic device.

At a step of 803, ranging is performed on a plurality of points on an outer surface of a to-be-measured object by utilizing the ranging module according to the ranging dot matrix density, to obtain depth information of the plurality of points.

At a step of 804, a standard three-dimensional coordinate system is built according to the depth information of at least three points of the plurality of points.

At a step of 805, the to-be-measured object is photographed according to the picture material pixel value to obtain a plurality of picture materials.

At a step of 806, three-dimensional imaging processing is performed on the to-be-measured object according to the standard three-dimensional coordinate system, the depth information of the plurality of points, and the plurality of picture materials.

It can be seen that steps 801 to 806 in this embodiment are substantially the same as steps 701 to 706 in the fourth embodiment, so the details will not be repeated herein.

At a step of 807, an image pixel unit of the three-dimensional image is compressed according to a preset compression format, and three-dimensional dimension information is retained in the three-dimensional image, to obtain the three-dimensional image to be encapsulated.

In other words, in the compression process, only the image pixel unit is compressed, and the three-dimensional dimension information is not compressed.

At a step of 808, the obtained three-dimensional image to be encapsulated is encapsulated according to the preset encapsulation format to obtain the three-dimensional image file.

At a step of 809, a mapping relationship between the preset encapsulation format and the three-dimensional image file is established, and the three-dimensional image file is saved in a pre-built three-dimensional image file management database according to the mapping relationship.

It can be seen that steps 808 to 809 in this embodiment are substantially the same as steps 707 to 708 in the fourth embodiment, so the details will not be repeated herein.

In this embodiment, the three-dimensional image is compressed before being encapsulated, so as to reduce the size of the final three-dimensional image file obtained through encapsulating, thereby reducing the occupation of storage space by the three-dimensional image file management database.

In addition, during the compression of the three-dimensional image, only the image pixel unit is compressed, and the three-dimensional dimension information is not compressed, such that the three-dimensional dimension information which affects the overall size of the three-dimensional image is ensured as much as possible. In this way, another electronic device, after obtaining the three-dimensional image file, can precisely restore the three-dimensional profile of the to-be-measured object according to the uncompressed three-dimensional dimension information. In other words, based on this compression mode, the fidelity of simulation of the three-dimensional material of the to-be-measured object is reduced as much as possible.

In addition, it should be understood that the division of the steps of the above methods is only for the sake of clear description, and in practical applications, the steps may be combined into one step, or some steps may be divided into multiple steps, which all falls within the scope of protection of the present disclosure as long as the same logical relationship is included. Any insignificant modification made to or any insignificant design introduced in an algorithm or process without changing the core design of the algorithm and process shall fall within the scope of protection of the present disclosure.

Figure 9:
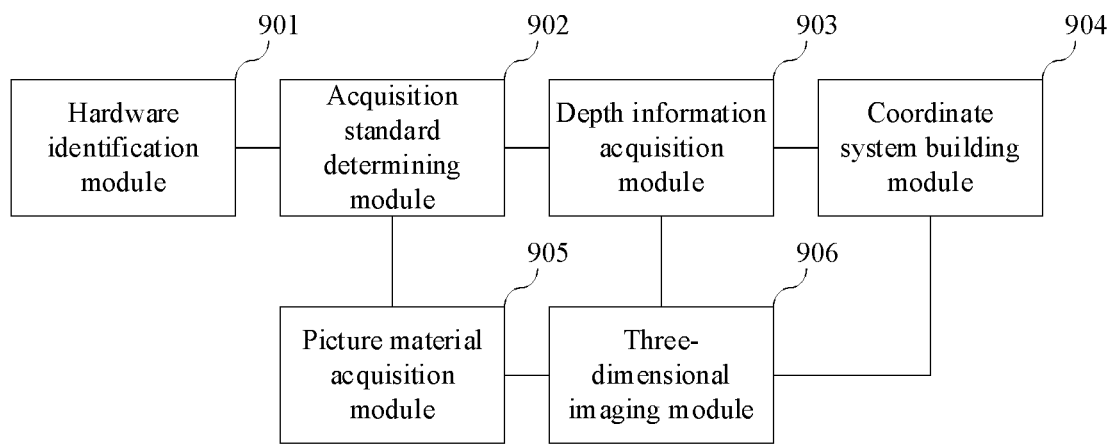
FIG. 9 is a schematic structural diagram of a three-dimensional imaging apparatus according to another embodiment of the present disclosure.

Another embodiment of the present disclosure relates to a three-dimensional imaging apparatus. As shown in FIG. 9, the apparatus includes: a hardware identification module 901, an acquisition standard determining module 902, a depth information acquisition module 903, a coordinate system building module 904, a picture material acquisition module 905, and a three-dimensional imaging module 906.

The hardware identification module 901 is configured for acquiring hardware configuration information of an electronic device and a ranging module supported by the electronic device. The acquisition standard determining module 902 is configured for determining a ranging dot matrix density and a picture material pixel value according to the hardware configuration information of the electronic device. The depth information acquisition module 903 is configured for ranging on a plurality of points on an outer surface of a to-be-measured object by utilizing the ranging module according to the ranging dot matrix density, and obtaining depth information of the plurality of points. The coordinate system building module 904 is configured for building a standard three-dimensional coordinate system according to the depth information of at least three points of the plurality of points. The picture material acquisition module 905 is configured for photographing the to-be-measured object according to the picture material pixel value and obtaining a plurality of picture materials. The three-dimensional imaging module 906 is configured for performing three-dimensional imaging processing on the to-be-measured object according to the standard three-dimensional coordinate system, the depth information of the plurality of points, and the plurality of picture materials.

In addition, in another example, the three-dimensional imaging apparatus further includes an encapsulation module and a storage module.

The encapsulation module is configured for encapsulating an obtained three-dimensional image according to a preset encapsulation format to obtain a three-dimensional image file. The storage module is configured for establishing a mapping relationship between the preset encapsulation format and the three-dimensional image file, and saving the three-dimensional image file in a pre-built three-dimensional image file management database according to the mapping relationship.

In addition, in another example, the preset encapsulation format is determined according to a transmission network type supported by the electronic device and/or hardware configuration information of an electronic device receiving the three-dimensional image file, and at least specifies a resolution and a file size of the three-dimensional image file obtained through encapsulating.

Correspondingly, the encapsulation module is further configured for encapsulating the obtained three-dimensional image according to the resolution and the file size specified by the preset encapsulation format to obtain the three-dimensional image file complying with the preset encapsulation format.

In addition, in another example, the three-dimensional imaging apparatus further includes a compression module.

The compression module is configured for compressing an image pixel unit of the three-dimensional image according to a preset compression format, and retaining three-dimensional dimension information in the three-dimensional image, to obtain the three-dimensional image to be encapsulated.

Correspondingly, the encapsulation module is configured for encapsulating the obtained three-dimensional image to be encapsulated according to the preset encapsulation format to obtain the three-dimensional image file.

In addition, in another example, the three-dimensional imaging apparatus further includes a photographing position determining module.

The photographing position determining module is configured for determining a plurality of photographing positions according to the standard three-dimensional coordinate system and the depth information of the at least three points.

It should be noted that each of the plurality of photographing positions determined in the above manner in this embodiment corresponds to one region on the outer surface of the to-be-measured object.

Correspondingly, the picture material acquisition module 905 is further configured for photographing the to-be-measured object at each of the plurality of photographing positions according to the picture material pixel value to obtain the plurality of picture materials.

In addition, in another example, the three-dimensional imaging module 906 is further configured for drawing a three-dimensional profile of the to-be-measured object in the standard three-dimensional coordinate system according to the depth information of the plurality of points, and performing mapping and rendering of the three-dimensional profile according to the plurality of picture materials.

In addition, in another example, the three-dimensional imaging apparatus further includes a picture material detection module and a prompting module.

The picture material detection module is configured for determining whether the plurality of picture materials cover each region on the outer surface of the to-be-measured object.

Correspondingly, when it is determined through detection that the plurality of picture materials do not cover each region on the outer surface of the to-be-measured object, the photographing position determining module is instructed to execute an operation of determining, according to the standard three-dimensional coordinate system, the photographing position corresponding to an unphotographed region on the outer surface of the to-be-measured object.

The prompting module is configured for providing a position movement prompt according to the photographing position determined by the photographing position determining module, and after detecting that the photographing position has been reached, instructing the picture material acquisition module 905 to execute an operation of photographing the to-be-measured object according to the picture material pixel value, to obtain the picture material corresponding to the unphotographed region on the outer surface of the to-be-measured object.

In addition, in another example, the acquisition standard determining module 902 is further configured for calling a pre-compiled performance test program to determine a predicted network capability value and a predicted image processing capability value corresponding to the hardware configuration information; and determining the ranging dot matrix density and the picture material pixel value according to the predicted network capability value and the predicted image processing capability value.

In addition, in another example, the ranging module includes at least one of: at least one lidar module, at least two visible light camera modules, a UWB ranging component, or a millimeter wave ranging component.

In addition, in another example, if the ranging module includes at least any two of at least one lidar module, at least two visible light camera modules, a UWB ranging component, or a millimeter wave ranging component, the depth information acquisition module 903 is further configured for performing ranging on the plurality of points on the outer surface of the to-be-measured object by utilizing each of the supported ranging modules according to the ranging dot matrix density, to obtain the depth information of the plurality of points.

Correspondingly, the coordinate system building module 904 is further configured for superimposing the obtained initial three-dimensional coordinate systems, and subtracting a position error through averaging, to obtain the standard three-dimensional coordinate system.

It can be seen that this embodiment is an apparatus embodiment corresponding to the foregoing method embodiments, and this embodiment may be implemented in combination with any one of the foregoing method embodiments. The related technical details mentioned in any one of the foregoing method embodiments are still valid in this embodiment, and the details will not be repeated here to reduce repetition. Accordingly, the related technical details mentioned in this embodiment also apply to any one of the foregoing method embodiments.

It is to be noted that each module involved in this embodiment is a logic module. In practical applications, a logic unit may be a physical unit or a part of a physical unit, or may be implemented by a combination of a plurality of physical units. In addition, in order to highlight the innovative part of the present disclosure, units that are not closely related to the technical problem to be solved in the present disclosure are not introduced in this embodiment, but this does not mean that there are no other units in this embodiment.

Figure 10:
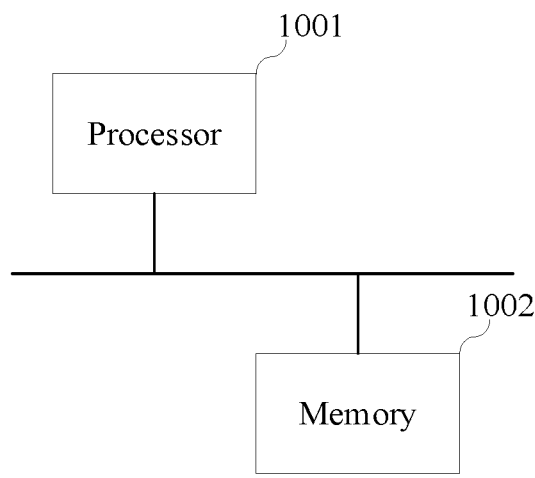
FIG. 10 is a schematic structural diagram of a three-dimensional imaging device according to another embodiment of the present disclosure.

Another embodiment of the present disclosure relates to a three-dimensional imaging device. As shown in FIG. 10, the device includes: at least one processor 1001; and a memory 1002 communicatively connected to the at least one processor 1001. The memory 1002 stores an instruction executable by the at least one processor 1001 which, when executed by the at least one processor 1001, causes the at least one processor 1001 to implement the three-dimensional imaging method according to the foregoing method embodiments.

The memory 1002 and the processor 1001 are connected by a bus. The bus may include any number of interconnected buses and bridges. The bus connects various circuits of one or more processors 1001 and the memory 1002 together. The bus may also connect a peripheral device, a voltage regulator, a power management circuit, and other circuits, which are well known in the art and therefore will not be detailed herein. A bus interface provides an interface between the bus and a transceiver. The transceiver may be one element or a plurality of elements, for example, a plurality of receivers and transmitters, and provides a unit for communicating with various other apparatus over a transmission medium. Data processed by the processor 1001 is transmitted over a wireless medium through an antenna. The antenna further receives data and transmits the data to the processor 1001.

The processor 1001 is configured for managing the bus and general processing and may also provide various functions including timing, peripheral interfaces, voltage regulation, power management and other control functions. The memory 1002 may be configured to store data used by the processor 1001 in performing operations.

Another embodiment of the present disclosure relates to a computer-readable storage medium, storing a computer program which, when executed by a processor, causes the processor to implement the three-dimensional imaging method according to the foregoing method embodiments.

It may be understood by those having ordinary skills in the art that all or some of the operations of the methods in the above embodiments may be implemented by a program instructing related hardware. The program is stored in a storage medium, and includes several instructions to cause a device (which may be a single chip microcomputer, a chip, etc.) or a processor to perform all or some of the operations of the methods described in the embodiments of the present disclosure. The foregoing storage medium includes: any medium that can store program code, such as a USB flash drive, a removable hard disk, a read-only memory (ROM), a Random Access Memory (RAM), a magnetic disk, or an optical disk.

It may be understood by those having ordinary skills in the art that the foregoing embodiments are embodiments for practicing the present disclosure and that in practical applications, various changes in form and details may be made without departing from the scope of the present disclosure.

What is claimed is:

1. A three-dimensional imaging method, comprising:
   acquiring hardware configuration information of an electronic device and a ranging module supported by the electronic device;
   determining a ranging dot matrix density and a picture material pixel value according to the hardware configuration information of the electronic device;
   ranging on a plurality of points on an outer surface of a to-be-measured object by utilizing the ranging module according to the ranging dot matrix density, and obtaining depth information of the plurality of points;
   building a standard three-dimensional coordinate system according to the depth information of at least three points of the plurality of points;
   photographing the to-be-measured object according to the picture material pixel value and obtaining a plurality of picture materials; and
   performing three-dimensional imaging processing on the to-be-measured object according to the standard three-dimensional coordinate system, the depth information of the plurality of points, and the plurality of picture materials;
   wherein determining a ranging dot matrix density and a picture material pixel value according to the hardware configuration information of the electronic device comprises:
   calling a pre-compiled performance test program to determine a predicted network capability value and a predicted image processing capability value corresponding to the hardware configuration information; and
   determining the ranging dot matrix density and the picture material pixel value according to the predicted network capability value and the predicted image processing capability value.

2. The three-dimensional imaging method of claim 1, the method further comprises:
   encapsulating an obtained three-dimensional image according to a preset encapsulation format to obtain a three-dimensional image file; and
   establishing a mapping relationship between the preset encapsulation format and the three-dimensional image file, and saving the three-dimensional image file in a pre-built three-dimensional image file management database according to the mapping relationship.

3. The three-dimensional imaging method of claim 2, wherein the preset encapsulation format is determined according to a transmission network type supported by the electronic device and/or hardware configuration information of an electronic device receiving the three-dimensional image file, and at least specifies a resolution and a file size of the three-dimensional image file obtained through encapsulating; and
   encapsulating an obtained three-dimensional image according to a preset encapsulation format to obtain a three-dimensional image file comprises:
   encapsulating the obtained three-dimensional image according to the resolution and the file size specified by the preset encapsulation format to obtain the three-dimensional image file complying with the preset encapsulation format.

4. The three-dimensional imaging method of claim 3, the method further comprises:
   determining a plurality of photographing positions according to the standard three-dimensional coordinate system and the depth information of the at least three points, wherein each of the plurality of photographing positions corresponds to a region on the outer surface of the to-be-measured object; and photographing the to-be-measured object according to the picture material pixel value and obtaining a plurality of picture materials comprises:
  photographing the to-be-measured object at each of the plurality of photographing positions according to the picture material pixel value to obtain the plurality of picture materials.

5. The three-dimensional imaging method of claim 3, wherein performing three-dimensional imaging processing on the to-be-measured object according to the standard three-dimensional coordinate system, the depth information of the plurality of points, and the plurality of picture materials comprises:
  drawing a three-dimensional profile of the to-be-measured object in the standard three-dimensional coordinate system according to the depth information of the plurality of points; and
  performing mapping and rendering of the three-dimensional profile according to the plurality of picture materials.

6. The three-dimensional imaging method of claim 2, wherein prior to encapsulating an obtained three-dimensional image according to a preset encapsulation format to obtain a three-dimensional image file, the method further comprises:
  compressing an image pixel unit of the three-dimensional image according to a preset compression format, and retaining three-dimensional dimension information in the three-dimensional image, to obtain the three-dimensional image to be encapsulated; and
  encapsulating an obtained three-dimensional image according to a preset encapsulation format to obtain a three-dimensional image file comprises:
    encapsulating the obtained three-dimensional image to be encapsulated according to the preset encapsulation format to obtain the three-dimensional image file.

7. The three-dimensional imaging method of claim 6, the method further comprises:
  determining a plurality of photographing positions according to the standard three-dimensional coordinate system and the depth information of the at least three points, wherein each of the plurality of photographing positions corresponds to a region on the outer surface of the to-be-measured object; and
  photographing the to-be-measured object according to the picture material pixel value and obtaining a plurality of picture materials comprises:
    photographing the to-be-measured object at each of the plurality of photographing positions according to the picture material pixel value to obtain the plurality of picture materials.

8. The three-dimensional imaging method of claim 6, wherein performing three-dimensional imaging processing on the to-be-measured object according to the standard three-dimensional coordinate system, the depth information of the plurality of points, and the plurality of picture materials comprises:
  drawing a three-dimensional profile of the to-be-measured object in the standard three-dimensional coordinate system according to the depth information of the plurality of points; and
  performing mapping and rendering of the three-dimensional profile according to the plurality of picture materials.

9. The three-dimensional imaging method of claim 2, the method further comprises:
  determining a plurality of photographing positions according to the standard three-dimensional coordinate system and the depth information of the at least three points, wherein each of the plurality of photographing positions corresponds to a region on the outer surface of the to-be-measured object; and
  photographing the to-be-measured object according to the picture material pixel value and obtaining a plurality of picture materials comprises:
    photographing the to-be-measured object at each of the plurality of photographing positions according to the picture material pixel value to obtain the plurality of picture materials.

10. The three-dimensional imaging method of claim 2, wherein performing three-dimensional imaging processing on the to-be-measured object according to the standard three-dimensional coordinate system, the depth information of the plurality of points, and the plurality of picture materials comprises:
  drawing a three-dimensional profile of the to-be-measured object in the standard three-dimensional coordinate system according to the depth information of the plurality of points; and
  performing mapping and rendering of the three-dimensional profile according to the plurality of picture materials.

11. The three-dimensional imaging method of claim 1, the method further comprises:
  determining a plurality of photographing positions according to the standard three-dimensional coordinate system and the depth information of the at least three points, wherein each of the plurality of photographing positions corresponds to a region on the outer surface of the to-be-measured object; and
  photographing the to-be-measured object according to the picture material pixel value and obtaining a plurality of picture materials comprises:
    photographing the to-be-measured object at each of the plurality of photographing positions according to the picture material pixel value to obtain the plurality of picture materials.

12. The three-dimensional imaging method of claim 11, wherein performing three-dimensional imaging processing on the to-be-measured object according to the standard three-dimensional coordinate system, the depth information of the plurality of points, and the plurality of picture materials comprises:
  drawing a three-dimensional profile of the to-be-measured object in the standard three-dimensional coordinate system according to the depth information of the plurality of points; and
  performing mapping and rendering of the three-dimensional profile according to the plurality of picture materials.

13. The three-dimensional imaging method of claim 1, wherein performing three-dimensional imaging processing on the to-be-measured object according to the standard three-dimensional coordinate system, the depth information of the plurality of points, and the plurality of picture materials comprises:
  drawing a three-dimensional profile of the to-be-measured object in the standard three-dimensional coordinate system according to the depth information of the plurality of points; and performing mapping and rendering of the three-dimensional profile according to the plurality of picture materials.

14. The three-dimensional imaging method of claim 13, wherein prior to performing mapping and rendering of the three-dimensional profile according to the plurality of picture materials, the method further comprises:
    determining whether the plurality of picture materials cover each region on the outer surface of the to-be-measured object;
    determining, according to the standard three-dimensional coordinate system, the photographing position corresponding to an unphotographed region on the outer surface of the to-be-measured object, in response to the plurality of picture materials not covering each region on the outer surface of the to-be-measured object;
    providing a position movement prompt according to the photographing position; and
    photographing the to-be-measured object according to the picture material pixel value after the electronic device moves to the photographing position, to obtain the picture material corresponding to the unphotographed region on the outer surface of the to-be-measured object.

15. The three-dimensional imaging method of claim 1, wherein the ranging module at least comprises one of:
    at least one lidar module,
    at least two visible light camera modules,
    an Ultra Wide Band (UWB) ranging component, or
    a millimeter wave ranging component.

16. The three-dimensional imaging method of claim 15, wherein the ranging module comprises at least any two of:
    at least one lidar module, at least two visible light camera modules, a UWB ranging component, or a millimeter wave ranging component;
        ranging on a plurality of points on an outer surface of a to-be-measured object by utilizing the ranging module according to the ranging dot matrix density, and obtaining depth information of the plurality of points comprises:
            performing ranging on the plurality of points on the outer surface of the to-be-measured object by utilizing each of the supported ranging modules according to the ranging dot matrix density, to obtain the depth information of the plurality of points; and
        building a standard three-dimensional coordinate system according to the depth information of at least three points of the plurality of points comprises:
            acquiring the depth information of the at least three points which is obtained through ranging by each of supported ranging modules respectively;
            building an initial three-dimensional coordinate system for each of the supported ranging modules according to the depth information of the at least three points; and
            superimposing the obtained initial three-dimensional coordinate systems, and subtracting a position error through averaging, to obtain the standard three-dimensional coordinate system.

17. A three-dimensional imaging apparatus, comprising:
    at least one processor; and
    a memory communicatively connected to the at least one processor, wherein:
        the memory stores an instruction executable by the at least one processor which, when executed by the at least one processor, causes the at least one processor to perform a three-dimensional imaging method, comprising:
            acquiring hardware configuration information of an electronic device and a ranging module supported by the electronic device;
            determining a ranging dot matrix density and a picture material pixel value according to the hardware configuration information of the electronic device;
            ranging on a plurality of points on an outer surface of a to-be-measured object by utilizing the ranging module according to the ranging dot matrix density, and obtaining depth information of the plurality of points;
            building a standard three-dimensional coordinate system according to the depth information of at least three points of the plurality of points;
            photographing the to-be-measured object according to the picture material pixel value and obtaining a plurality of picture materials; and
            performing three-dimensional imaging processing on the to-be-measured object according to the standard three-dimensional coordinate system, the depth information of the plurality of points, and the plurality of picture materials;
        wherein determining a ranging dot matrix density and a picture material pixel value according to the hardware configuration information of the electronic device comprises:
            calling a pre-compiled performance test program to determine a predicted network capability value and a predicted image processing capability value corresponding to the hardware configuration information; and
            determining the ranging dot matrix density and the picture material pixel value according to the predicted network capability value and the predicted image processing capability value.

18. A non-transitory computer-readable storage medium, storing a computer program which, when executed by a processor, causes the processor to perform a three-dimensional imaging method, comprising:
    acquiring hardware configuration information of an electronic device and a ranging module supported by the electronic device;
    determining a ranging dot matrix density and a picture material pixel value according to the hardware configuration information of the electronic device;
    ranging on a plurality of points on an outer surface of a to-be-measured object by utilizing the ranging module according to the ranging dot matrix density, and obtaining depth information of the plurality of points;
    building a standard three-dimensional coordinate system according to the depth information of at least three points of the plurality of points;
    photographing the to-be-measured object according to the picture material pixel value and obtaining a plurality of picture materials; and
    performing three-dimensional imaging processing on the to-be-measured object according to the standard three-dimensional coordinate system, the depth information of the plurality of points, and the plurality of picture materials;

wherein determining a ranging dot matrix density and a picture material pixel value according to the hardware configuration information of the electronic device comprises:

calling a pre-compiled performance test program to determine a predicted network capability value and a predicted image processing capability value corresponding to the hardware configuration information; and determining the ranging dot matrix density and the picture material pixel value according to the predicted network capability value and the predicted image processing capability value.

* * * * *